United States Patent
Yahav

(10) Patent No.: US 6,445,884 B1
(45) Date of Patent: Sep. 3, 2002

(54) CAMERA WITH THROUGH-THE-LENS LIGHTING

(75) Inventor: Giora Yahav, Haifa (IL)

(73) Assignee: 3DV Systems, Ltd., Yokneam (IL)

( * ) Notice: Subject to any disclaimer, the term of this patent is extended or adjusted under 35 U.S.C. 154(b) by 0 days.

(21) Appl. No.: 09/250,322

(22) Filed: Feb. 16, 1999

Related U.S. Application Data

(63) Continuation-in-part of application No. 08/981,357, filed on Dec. 19, 1997, which is a continuation-in-part of application No. 08/981,359, filed as application No. PCT/IL96/00021 on Jun. 20, 1996, now Pat. No. 6,091,905, said application No. 08/918,357, filed as application No. PCT/IL96/00020 on Jun. 20, 1996, now Pat. No. 6,057,909.

(30) Foreign Application Priority Data

Jun. 22, 1995 (IL) .................................................. 114278
Dec. 1, 1995 (IL) .................................................. 116223

(51) Int. Cl.[7] .......................... G03B 15/02; G03B 29/00
(52) U.S. Cl. ....................... 396/106; 396/176; 396/429; 356/4.07; 356/5.01; 348/370
(58) Field of Search .......................... 348/370; 356/1–5, 356/141, 152, 407, 4.01, 4.07, 5.01, 5.02, 5.03; 396/106–110, 429, 431, 155, 176

(56) References Cited

U.S. PATENT DOCUMENTS

| | | | |
|---|---|---|---|
| 3,571,493 A | 3/1971 | Baker et al. | |
| 3,629,796 A | 12/1971 | Brownscombe et al. | |
| 3,734,625 A | 5/1973 | Aagard | |
| 3,834,816 A | 9/1974 | Pedinoff | |

(List continued on next page.)

FOREIGN PATENT DOCUMENTS

| | | |
|---|---|---|
| DE | 30 21 448 | 12/1981 |
| DE | 40 26 956 | 3/1992 |
| EP | 0 313 518 | 4/1989 |
| EP | 0 465 806 | 1/1992 |
| EP | 0 474 264 | 3/1992 |
| WO | WO 89/12837 | 12/1989 |
| WO | WO 98/26583 | 6/1998 |

OTHER PUBLICATIONS

Anthes et al.; "Non–scanned LADAR imaging and applications"; SPIE; vol. 1936; pp. 11–22; 1993.

Burns et al.; "Compact, 625–Chanel Scannerless Imaging Laser Radar Receiver"; SPIE; vol. 2748; pp. 39–46; Conference date Apr. 10, 1996; Abstract in 1995.

Christie et al.; "Design and Development of a Multi–Detecting Two–Dimensional Ranging Sensor"; Measurement Science & Technology; vol. 6; No. 9; pp. 1301–1308; Sep. 1995.

(List continued on next page.)

Primary Examiner—David M. Gray
(74) Attorney, Agent, or Firm—Fenster & Company Patent Attorneys Ltd.

(57) ABSTRACT

A camera is provided with through the lens lighting. An light source provides boresighted illumination by using a beamsplitter or mirror to illuminate a field of view which is congruent with the field of view of the image sensor of the camera. The light source can be an extended light source having a dimensions about equal to the image sensor. The surface of the image sensor, the light source or the beam splitter can be modulated such that light directly from the light source does not impinge the sensor.

29 Claims, 5 Drawing Sheets

U.S. PATENT DOCUMENTS

| | | |
|---|---|---|
| 4,143,263 A | 3/1979 | Eichweber |
| 4,408,263 A | 10/1983 | Sternlicht |
| 4,477,184 A | 10/1984 | Endo |
| 4,501,961 A | 2/1985 | Stauffer |
| 4,591,918 A | 5/1986 | Hisano |
| 4,687,326 A | 8/1987 | Corby, Jr. |
| 4,734,733 A | 3/1988 | Clapp et al. |
| 4,734,735 A | 3/1988 | Haneda |
| 4,769,700 A | 9/1988 | Pryor |
| 4,780,732 A | 10/1988 | Abramov |
| 4,935,616 A | 6/1990 | Scott |
| 4,959,726 A | 9/1990 | Midda et al. |
| 4,971,413 A | 11/1990 | Inoue |
| 4,991,953 A | 2/1991 | Pflibsen et al. |
| 5,009,502 A | 4/1991 | Shih et al. |
| 5,056,914 A | 10/1991 | Kollodge |
| 5,081,530 A | 1/1992 | Medina |
| 5,090,803 A | 2/1992 | Ames et al. |
| 5,110,203 A | 5/1992 | Maccabee |
| 5,157,451 A | 10/1992 | Taboada et al. |
| 5,198,877 A | 3/1993 | Schulz |
| 5,200,793 A | 4/1993 | Ulich et al. |
| 5,200,931 A | 4/1993 | Kosalos et al. |
| 5,216,259 A | 6/1993 | Stern et al. |
| 5,220,164 A | 6/1993 | Lieber et al. |
| 5,225,882 A | 7/1993 | Hosokawa et al. |
| 5,243,553 A | 9/1993 | Flockencher |
| 5,253,033 A | 10/1993 | Lipchak et al. |
| 5,255,087 A | 10/1993 | Nakamura et al. |
| 5,265,327 A | 11/1993 | Faris et al. |
| 5,334,848 A | 8/1994 | Grimm |
| 5,343,391 A | 8/1994 | Mushabac |
| 5,345,266 A | 9/1994 | Denyer |
| 5,351,677 A | 10/1994 | Kami et al. |
| 5,408,263 A | 4/1995 | Kikuchi et al. |
| 5,434,612 A | 7/1995 | Nettleton et al. |

OTHER PUBLICATIONS

Clark, V.; "Large Area Array with Non–Linear Active Current–Mode Pixels"; talks given at 1996 SSCTC Workshop on CMOS Imaging Technology.

Delong et al.; "Underwater Laser Imaging System"; Proceeding of the Autonomous Vehicles in Mine Countermeasures Symposium; pp. 6–103 thru 6–111; Apr. 1995.

Garcia et al.; Characterization of a Scannerless LADAR System; SPIE; vol. 1936; pp. 23–30; 1993.

Hill et al.; "A Multi–Detecting Rangefinder Capable of Range Imaging"; Applied Optics and Optoelectronics; University of York; Abstract Book; pp. 208–210; Sep. 1994.

Muguira et al.; "Scannerless Range Imaging with a Square Wave"; SPIE; vol. 2472; pp. 106–113; Conference date Apr. 1995.

Sackos et al.; "The emerging Versatililty of Scannerless Range Imager"; SPIE; vol. 2748; pp. 47–60; Conference was in Apr. 1996.

Schwarte, R. et al.; A New Electrooptical Mixing and Correlating Sensor: Facilities and Application of the Photonic Mixer Device (PMD); SPIE; vol. 3100; pp. 245–253.

Strand; "Underwater Electro–optical System for Mine Identification", Proceedings of the Autonomous Vehicles in Mine Countermeasures Symposium; pp. 6–238 thru 6–247.

Swartz; "diver and ROV Deployable Laser Range Gate Underwater Imaging Systems"; Underwater Intervention '93; Conference Proceedings; pp. 193–199; 1993.

Vietze, O. et al.; "Imaging Densing with Programmable Offset Pixels for Increased Synamic Range of More Than 150 db"; SPIE; vol. 2654; pp. 93–98.

"Intensified Less System"; Commercial Publication by Imco Electro–optics Ltd.; Essex; UK.

CAMERA WITH THROUGH-THE-LENS LIGHTING

RELATED APPLICATIONS

This application is a continuation-in-part of U.S. patent application Ser. No. 08/981,357 filed Dec. 19, 1997 which is the national phase of PCT application PCT/IL96/00020 filed Jun. 20, 1996. This application is also a continuation in part of U.S. patent application Ser. No. 08/981,359 filed Dec. 19, 1997 which is the national phase of PCT application PCT/IL96/00021 filed Jun. 20, 1996. The disclosures of all these applications, including all appendixes thereof, are incorporated herein by reference.

FIELD OF THE INVENTION

The present invention relates to cameras with "through-the-lens" lighting and in particular to cameras with "through-the-lens" lighting and a dual-modulation system for protecting the photosensitive surface from stray light.

BACKGROUND OF THE INVENTION

In cameras, true frontal lighting is achieved when the light source is positioned behind the lens, on the lens's optical axis. To reach the image, the light must pass through the lens. With "through-the-lens" lighting there is no shadowing.

The condition of no shadowing is valuable for general photography. It is also important in optical-ranging applications for distance measuring and for acquiring three-dimensional views. Theoretically, in optical-ranging applications, the distance between the camera and a point on a scene is directly related to the amount of reflected radiation from that point. Clearly shadowing introduces errors to the measurements.

An added advantage of "through-the-lens" lighting is that by proper arrangement, it is possible to illuminate substantially only the field of view of the camera. Thus, light losses are be minimized.

Naturally, positioning the light source behind the lens, on the optical axis, would block reflected radiation from the scene; a shadow of the light source would be formed on the photosensitive surface. However, the light source can be located behind the lens, sufficiently offset from the optical axis so as not to block the path of reflected radiation from the scene. The light is boresighted with the optical axis using a beamsplitter or a mirror.

Cameras with "through-the-lens" lighting, using a coherent, collimated, internal light source, are known. U.S. Pat. No. 5,200,793, which is incorporated herein by reference, describes an optical-ranging camera with "through-the-lens" lighting wherein the light passes through an expander/collimator, collimating the beam and modifying its diameter. It is then boresighted with the optical axis using a beamsplitter and directed through a objective lens; the desired field of view is illuminated. A light modulator on the optical axis modulates both outgoing light and reflected radiation from the scene, according to a wave function, generally sinusoidal wave function. Generally, the light source is laser light. A band-pass filter, adjacent to the photosensitive surface, protects the photosensitive surface from ambient light. However, the band-pass filter does not protect the photosensitive surface from stray light originating from the internal light source (and having essentially the same frequency as reflected radiation from the scene).

SUMMARY OF THE INVENTION

It is an aspect of some preferred embodiments of the present invention that a camera be constructed with "through-the-lens" lighting, wherein a light source is located behind the lens. Preferably, the light is boresighted with the optical axis of the camera, using a beamsplitter or a mirror.

In some preferred embodiments of the present invention, a source of incoherent light is used. Alternatively, a source of coherent light is used.

In some preferred embodiments of the present invention, the light is collimated and the beam diameter modified such that the light that emerges through the lens illuminates substantially only the field of view of the camera.

In preferred embodiments of this aspect, FOV, the field of view of the camera is substantially equal to FOI, the field of illumination. As a result, shadowing is eliminated, illumination of the scene is homogenous and the sense of depth is improved, all these leading to optimal illumination.

Alternatively or additionally, an extended light source is preferably used, wherein the light is not collimated. Preferably the light source has an optical extent substantially the same as that of the photosensitive surface. This means that the effective angle illuminated by the light source as it leaves the camera (FOI) is the same as the effective angle viewed by photosensitive surface (FOV).

An aspect of some preferred embodiments of the present invention is that a camera with "through-the-lens" lighting include a variable-aperture iris, adjacent to the light source, in order to reduce the beam diameter, when desired, such that only a portion of the field of view is illuminated. In preferred embodiments of this aspect, partial illumination of the field of view is made possible. However, generally, the best mode operation is when FOV is substantially the same as FOI.

An aspect of some preferred embodiments of the present invention is that a camera with "through-the-lens" lighting include a dual modulation system comprising a fast light modulator positioned between the beamsplitter (or mirror) and the photosensitive surface and a fast light modulator positioned between the beamsplitter (or mirror) and the light source. A controller, or some appropriate circuitry, controls the two modulators and the light-source. Alternatively, the photosensitive surface itself is switched between an on and off so that it does or does not react to the light incident on it.

In some preferred embodiments of this aspect, a method of dual modulation is carried out which substantially blocks light from reaching the photosensitive surface (or turns the surface off) whenever the light-source is on, yet insures that all the desired radiation reflected from the scene is collected.

Alternatively or additionally, a method of dual modulation is carried out as an effective gain control, to equalize, to some extent, the amount of light reflected from the main object and the amount of light reflected from the background. This serves to increase the signal to noise ratio of a resultant image while avoiding overloading of those portions of the photosensitive surface that image bright parts of the image.

An aspect of some preferred embodiments of the present invention is that a camera with "through-the-lens" lighting be constructed in the CMOS technology, with only one fast light modulator, positioned between the beamsplitter (or mirror) and the light source. Modulation of the photosensitive area is carried out at the level of the pixels. A controller, or some appropriate circuitry, controls the modulation of the light-source and the modulation of the pixels.

In preferred embodiments of this aspect, a program of dual modulation is carried out which substantially blocks light from activating the photosensitive surface whenever the light-source is on. Since gating of the photosensitive area is carried out at the level of the pixels, it is possible to control the amount of radiation reflected from the scene that is collected on each pixel. In this manner, effective gain control, equalizing the amount of light reflected from the main object and the amount of light reflected from the background is better achieved.

There is thus provided, in accordance with a preferred embodiment of the invention, a camera with through-the-lens lighting, comprising:

a light source that produces incoherent light;

a photosensitive surface;

focusing optics, having an optical axis, that forms an image of a scene, within a field of view, on the photosensitive surface, wherein the light is boresighted with the optical axis and directed toward the scene, illuminating substantially only the field of view of the camera.

Preferably, the focusing optics comprises telecentric optics which collimates reflected radiation from the scene.

Preferably, the focusing optics includes a collimating lens which collimates the light.

In a preferred embodiment of the invention, the camera is an optical ranging camera and comprising a single modulator which modulates both the collimated, incoherent light and reflected radiation from the scene, wherein only a desired, gated portion of the reflected radiation from the scene is collected and wherein intensity values of the image are indicative of distances of objects from the camera.

Preferably, the light source is a modulated light source and the light reaching the photosensitive surface is modulated by a modulator.

Preferably, the light source is modulated and the sensitivity of the photosensitive surface is modulated.

There is further provided, in accordance with a preferred embodiment of the invention, a camera with through-the-lens lighting, comprising:

a modulated light source;

a photosensitive surface;

focusing optics, having an optical axis, that forms an image of a scene, within a field of view, on the photosensitive surface, wherein the light is boresighted with the optical axis and directed toward the scene, illuminating substantially only the field of view of the camera;

a modulator which modulates radiation striking the photosensitive surface or the sensitivity of the photosensitive surface, wherein the modulator does not modulate the light source; and a controller, controlling the modulator and the modulation of the light-source, to block a reaction of the photosensitive surface whenever the modulated source of light is on, while insuring that all the desired radiation reflected from the scene is collected.

Preferably the camera includes a collimating lens which collimates the light.

In a preferred embodiment of the invention, the light is coherent. Alternatively, the light is incoherent.

In a preferred embodiment of the invention, the camera is an optical ranging camera, only a desired, gated portion of the reflected radiation from the scene is collected and intensity values of the image are indicative of distances of objects from the camera.

In a preferred embodiment of the invention, the focusing optics comprises telecentric optics which collimates also reflected radiation from the scene.

In a preferred embodiment of the invention the modulator is operative to vary the sensitivity of the photosensitive surface.

In a preferred embodiment of the invention, the modulator modulates radiation striking the photosensitive surface and transmits substantially all the reflected radiation from the scene that reaches the camera.

In a preferred embodiment of the invention, the camera includes:

a controller, controlling the modulator and the modulation of the light-source, to block activation of the photosensitive surface whenever the modulated source of light is on, while insuring that all the desired radiation reflected from the scene is collected.

In a preferred embodiment of the invention, the modulator does not modulate the light from the light source that illuminates the scene.

Preferably, the controller provides a plurality of light pulses such that a total desired amount of light reaches the photosensitive surface from the scene.

In a preferred embodiment of the invention, the source and photosensitive surface have substantially equivalent optical extents, so that light emerges through the lens, illuminating substantially only the field of view of the camera.

In a preferred embodiment of the invention, the light source is an extended light source and comprising a variable-aperture iris adjacent to the extended source for controlling the extent of the illuminated field of view.

There is further provided, in accordance with a preferred embodiment of the invention, a method of creating an image with through-the-lens lighting comprising:

boresighting the beam with the optical axis of a camera, having a field of view; and illuminating a scene with a beam of incoherent light, emerging from the camera along the optical axis, such that only the field of view of the camera is illuminated by the beam.

There is further provided, in accordance with a preferred embodiment of the invention, a method of creating an image with through-the-lens lighting comprising:

providing a modulated beam of light;

boresighting the beam with an optical axis of a camera having a field of view;

illuminating a scene with the beam, emerging from the camera, such that substantially only the field of view of the camera is illuminated; and modulating the activation of a photosensitive surface of the camera in synchrony with the beam modulation, such that light is blocked from activating the photosensitive surface whenever the beam is on, while insuring that all the desired reflected radiation from the scene is collected on the photosensitive surface.

Preferably, modulating the activation comprises blocking light from incidence on the photosensitive surface.

Preferably, modulating the activation comprises modulating the sensitivity of the photosensitive surface.

Preferably, the method includes collimating the beam.

There is further provided, in accordance with a preferred embodiment of the invention, a method of creating an image with through-the-lens lighting comprising:

providing a beam of light, emanating from an extended source, internal to a camera;

boresighting the beam with an optical axis of the camera; and illuminating a scene with the beam, emerging from the camera, such that substantially only a field of view of the camera is illuminated.

Preferably, the method includes:

modulating the beam; and modulating the activity of the photosensitive surface in synchrony with the beam modulation, blocking light from activating the photosensitive surface whenever the beam is on, while insuring that all the desired reflected radiation from the scene is collected.

In a preferred embodiment of the invention, modulating the activity comprises blocking light from reaching the photosensitive surface. Alternatively, modulating the activity comprises modulating the sensitivity of the photosensitive surface.

In a preferred embodiment of the invention, modulating activation of the photosensitive surface in synchrony with the beam comprises:

estimating the average distance to the scene and the depth of scene;

modulating the light source with a multiple-pulse function of square pulses having a duration of $\delta_1$ seconds each, $\delta_2$ seconds apart, wherein during $\delta_1$, light is transmitted and during $\delta_2$, light is blocked; and modulating activation of the photosensitive surface with a multiple-pulse function of square pulses that is included within the inverse of the light-source modulation function, so that during $\delta_1$, the surface is not sensitive to light and during at least part of $\delta_2$, the surface is sensitive to light.

In a preferred embodiment of the invention, the duration of the light pulse, is shorter than twice the time taken for light to propagate to the scene and wherein $\delta_1 + \delta_2$, the time for a complete modulation cycle, is greater than the total time for light to propagate to the scene and for reflected radiation from all points on the scene to be recovered.

In a preferred embodiment of the invention, estimating comprises:

focusing the camera on the scene using the camera's focusing optics;

determining the distance to a point of optimum focus based on the setting of the focusing optics;

determining the depth of field of the focusing optics for that setting;

estimating the distance to scene based on the distance to a point of optimum focus; and estimating the depth of the scene based on the depth of field of the focusing optics for that setting.

In a preferred embodiment of the invention, estimating comprises:

setting the camera to a range-determining mode;

varying the modulation function; and using the first few images to estimate the distance to the scene and the depth of the scene.

Preferably, a number of pulses of light illuminates the scene to provide a desired illumination thereof, said desired illumination being based at least in part on the determined distance.

In a preferred embodiment of the invention, estimating comprises setting the value of distance to the scene plus the depth of the scene to be equal to the range of the light source.

In a preferred embodiment of the invention, modulating activation of the photosensitive surface in synchrony with the beam comprises:

estimating the amount of light reflected from different portions of the scene which reaches the camera from various parts of the scene; and modulating the light source, responsive to said estimate, with a multiple-pulse function of square pulses having a duration of $\delta_1$ seconds each, $\delta_2$ seconds apart, wherein during $\delta_1$, light is transmitted and during $\delta_2$, light is blocked; and modulating activation of the photosensitive surface with a multiple-pulse function of square pulses that is included within the inverse of the light-source modulation function, so that during $\delta_1$, the surface is not sensitive to light and during at least part of $\delta_2$, the surface is sensitive to light, so as to adjust the range of light reaching various portions of the photosensitive surface.

BRIEF DESCRIPTION OF THE DRAWINGS

The present invention will be more clearly understood from the following detailed description of the preferred embodiments of the invention and from the attached drawings, in which same number designations are maintained throughout the figures for each element and in which.

DETAILED DESCRIPTION OF PREFERRED EMBODIMENTS

Figure 1A:
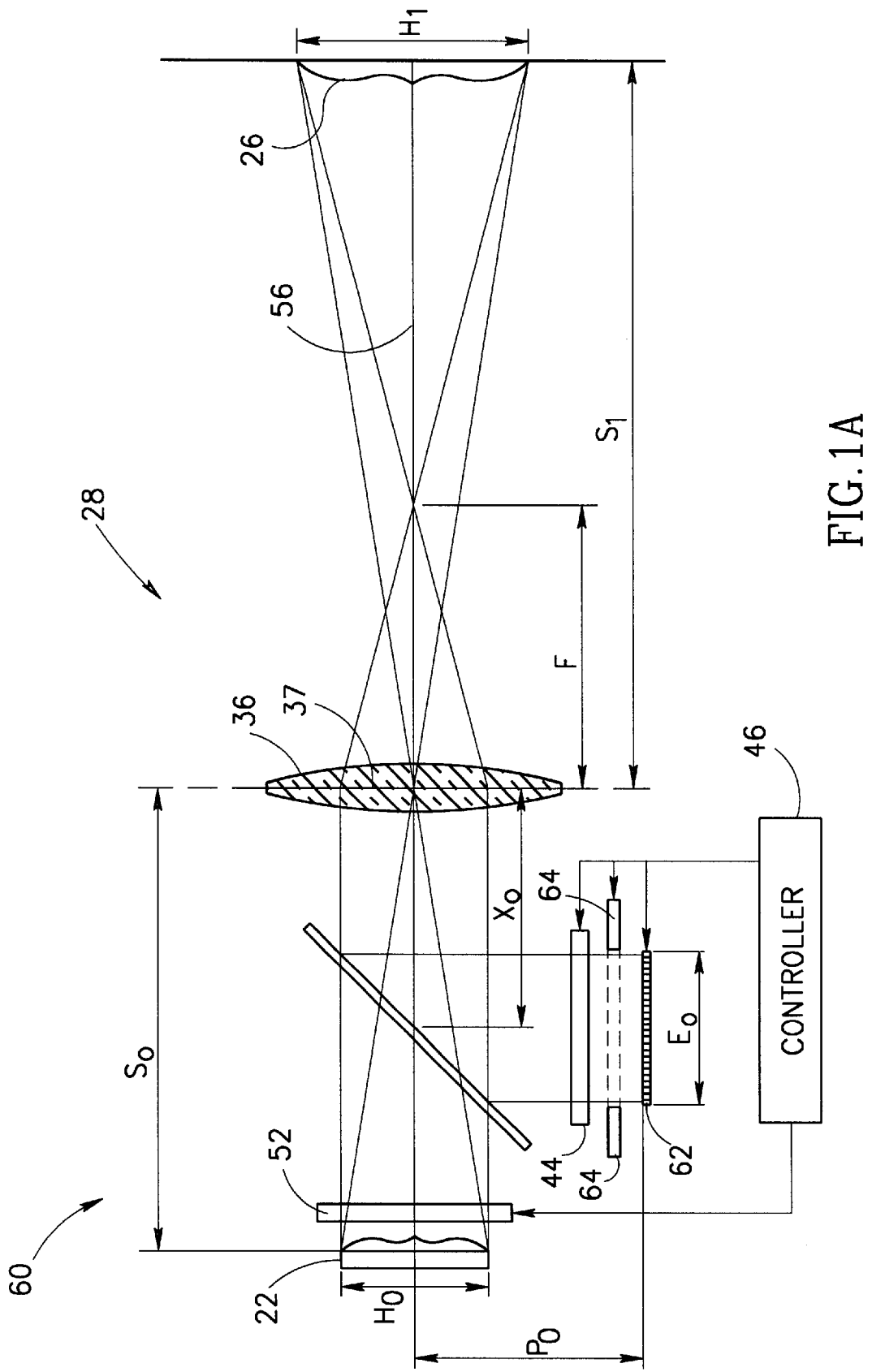
FIG. 1A is a schematic illustration of a camera with "through-the-lens" lighting having an extended light source behind the lens and a dual modulation program for photosensitive-surface protection from stray light, in accordance with a preferred embodiment of the invention.

Reference is now made to FIG. 1A, which is a schematic illustration of a camera 60 with "through-the-lens" lighting, in accordance with a preferred embodiment of the invention. Camera 60 comprises focusing optics 36, having a centerline 37 and an optical axis 56. Camera 60 further comprises a photosensitive surface 22, having an extent of diagonal Ho and located at a distance So from centerline 37 of focusing optics 36. It should be understood that the optics of the camera are greatly simplified; in practice, more complicated optics would generally be used. The field of view of the camera 60 is described by $H_1$, located at a distance $S_1$ from centerline 37 of focusing optics 36. In other words:

$$H_0/S_0 = H_1/S_1$$

Camera 60 further comprises an extended light source 62, preferably of the same shape as photosensitive surface 22. Preferably, extended light source 62 has an extent of diagonal $E_0$ and is located at a distance $X_0$ from centerline 37 of focusing optics 36, offset by a distance $P_0$ from optical axis 56.

Preferably, illumination from extended light source 62 is substantially boresighted with optical axis 56 using a beamsplitter (or a mirror) 58. Preferably, Distances $S_0$, $X_0$, $P_0$ and $S_1$ and extents $H_0$, $E_0$ and $H_1$ are such that:

$$H_0/S_0 = E_0/(X_0+P_0) = H_1/S_1$$

Consequently, FOV, the field of view of the camera is the same as FOI, the field of illumination of the light source. As used herein, the term "equivalent optical extent" is used for a light source and photoreceptor that have a size and position that results only in illumination of the field of view. In other words the detector and source are said to have an equivalent optical extent when their size, as viewed from outside the camera, through lens 36 is the same.

Another way to provide a source having an equivalent optical extent is to use a point source together with a field lens. The field lens projects the point source to the splitter such that it has the same extent when viewed from lens 36 or more precisely from the object 26 as does the detector.

In some preferred embodiments of the present invention, camera 60 has interchangeable lenses, so that at times focusing optics 36 may comprise a wide-angle lens of a short focal distance and at times focusing optics 36 may comprise a telescopic lens of a long focal distance. Alternatively or additionally, focusing optics 36 may comprise a zoom lens of varying focal distances. Yet in all these preferred embodiments, illumination of substantially only the camera's field of view, is maintained once equivalent optical extent of the source and photoreceptor is established.

In one embodiment of the invention, a variable-aperture iris 64, located near extended light source 62, controls optical extent of extended light source 62, hence the illuminated field of view. This allows for partial illumination of the field of view, or for matching of the optical source field of view to that of the photoreceptor.

Camera 60 also comprises two fast light modulators: a modulator 52 between beamsplitter (or mirror) 58 and photosensitive surface 22 and a modulator 44 between beamsplitter (or mirror) 58 and extended light source 62. Camera 60 further comprises a controller or some appropriate circuitry 46 to control the two modulators and the light-source.

A dual-modulation program, which will substantially prevent stray light from reaching the photosensitive surface is schematically illustrated in FIG. 2. Key to the dual-modulation program is the idea that when light is sent out in short pulses, it is possible to distinguish and separate stray light from radiation reflected from the scene. This is because stray light is almost concurrent with the light pulse itself, while reflected radiation from the scene arrives at some later time.

Figure 2A:
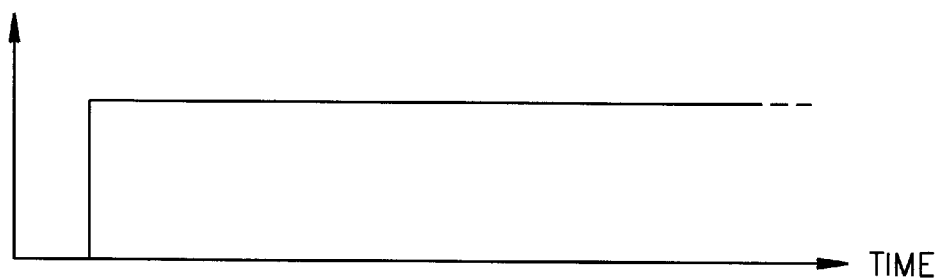
FIGS. 2A–2E is a schematic illustration of a dual-modulation program that effects photosensitive-surface protection from stray light, in accordance with a preferred embodiment of the invention.
Figure 2B:
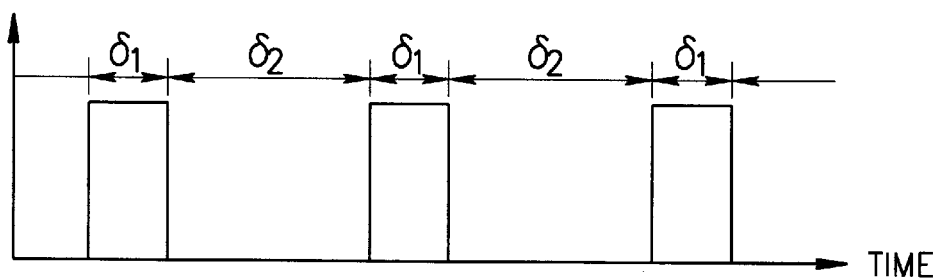
Figure 2C:
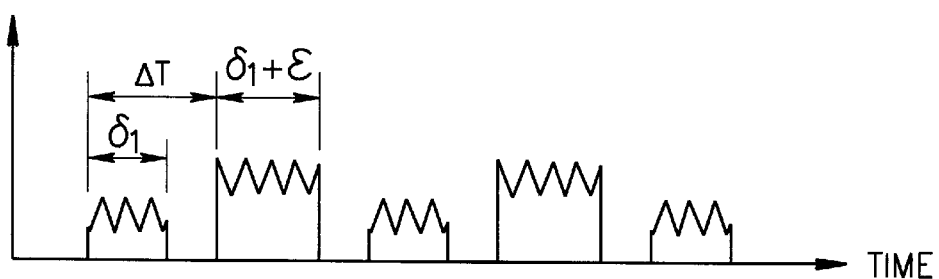
Figure 2D:
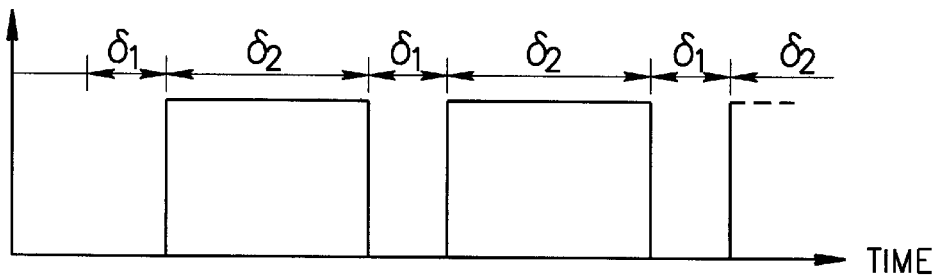

In a preferred embodiment of the invention, a relatively long light pulse of extended light source 62 (illustrated in FIG. 2A) The modulation function of light-source modulator 44 is preferably a multi-pulse function of preferably square pulses of 61 seconds each, emitted 62 seconds apart (illustrated in FIG. 2B).

On an unprotected photosensitive surface (illustrated in FIG. 2C), each light pulse of $\delta_1$ seconds generates two light peaks. The first, almost concurrent with the light pulse itself, is a peak of stray light, which dies out within a few internal camera light paths after the light pulse. The second, a peak of reflected radiation from scene 26, begins $\Delta t$ seconds after the beginning of the light pulse, where $\Delta t$ is twice the time of light propagation to scene 26. Since scene 26 has a certain depth, the peak of reflected radiation is longer than $\delta_1$ by some $\epsilon$ wherein $\epsilon$ is twice the time of light propagation through the depth of scene 26.

In order to distinguish the two peaks individually, with no overlap between them, the following conditions should preferably be met:

1. $\delta_1 < \Delta t$: The modulated light pulse should preferably be shorter than twice the time of light propagation to scene 26. This condition insures that when reflected radiation from scene 26 reaches the photosensitive surface, the stray light peak has already died out.
2. $\delta_1 + \delta_2 > \Delta t + \delta_1 + \epsilon$: The time for a complete modulation cycle of the light source should preferably be longer than the total time for light to propagate to scene 26 and for reflected radiation from all points of scene 26 to be recovered. This condition insures that the peak of reflected radiation from scene 26 dies out before a new light pulse and a new peak of stray light begins. This allows for an effective duty cycle of illumination of slightly less than 0.5, for shallow scenes and a known distance to the scene.

Preferably, the modulation function for radiation striking the photosensitive surface is approximately the inverse of the light source modulation function. Preferably it is a multi-pulse function of preferably square pulses, wherein light is blocked from reaching the photosensitive surface during $\delta_1$, when the light-source modulator is open and wherein light is transmitted to the photosensitive surface during $\delta_2$, when the light-source modulator is shut (illustrated in FIG. 2D). Alternatively, the photosensitive surface modulation function is included within the inverse of the light source modulation function, wherein light is blocked from reaching the photosensitive surface during all of $\delta_1$ and wherein light is transmitted to the photosensitive surface during part Of $\delta_2$.

Figure 2E:
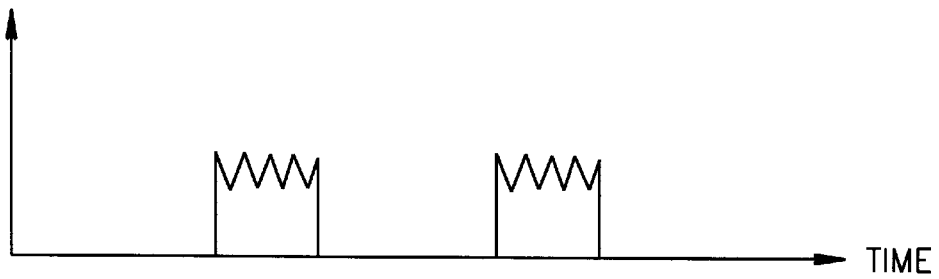

FIG. 2E illustrates the light that strikes photosensitive surface 22, wherein only the peaks of reflected radiation from the scene reach photosensitive surface 22.

Since the dual modulation program is dependent on $\Delta t$ and on $\epsilon$, a determination or an estimate of the distance to the scene and of the depth of the scene is useful if the duty cycle of the lighting is to be optimized.

In some preferred embodiments, the distance to the scene and of the depth of the scene may be estimated by a lens setting for optimum focus. Preferably, the controller receives information on the lens setting and determines the distance to the scene based on that setting. The depth of the scene may be estimated as the depth of field (the depth within good focus) for that lens setting. In general, the depth of field is distributed about ⅓ in front of the point of optimum focus and ⅔ behind it. Therefore, in using the lens setting for optimum focus as a distance indicator, the distance to the scene should preferably be taken as the distance to the point of optimum focus minus ⅓ the depth of field and the depth of the scene should preferably be taken as the depth of field.

Alternatively or additionally, an upper limit to $\Delta t + \epsilon$ may be estimated as the distance range of light source 62, i.e., the distance range within which the photosensitive surface receives light that results in correct exposure. (The distance range of light source 62 may be controlled by the number of light pulses of $\delta_1$ that are sent out.)

Alternatively or additionally, camera 60 may comprise a range-determining mode, wherein the modulation functions may be varied and the first few images may be used to determine the distance to the scene and its depth.

For some light sources, the multiple-pulse function may be used in order to reach a required exposure. The number of light pulses used will depend inter alia on one or more of the film speed, the distance to the object and the f stop of the focusing optics. All of these conditions are preferably taken into consideration, by controller 46 when determining the distance to number of light pulses to be provided per exposure.

In some preferred embodiments, light source 62 is an incoherent or coherent source which is not extended. Rather, the light is collimated and the beam diameter modified to match the extent of the photosensitive surface. In these preferred embodiments too, the light emerges through the lens, illuminating substantially only the field of view of the camera.

Figure 1B:
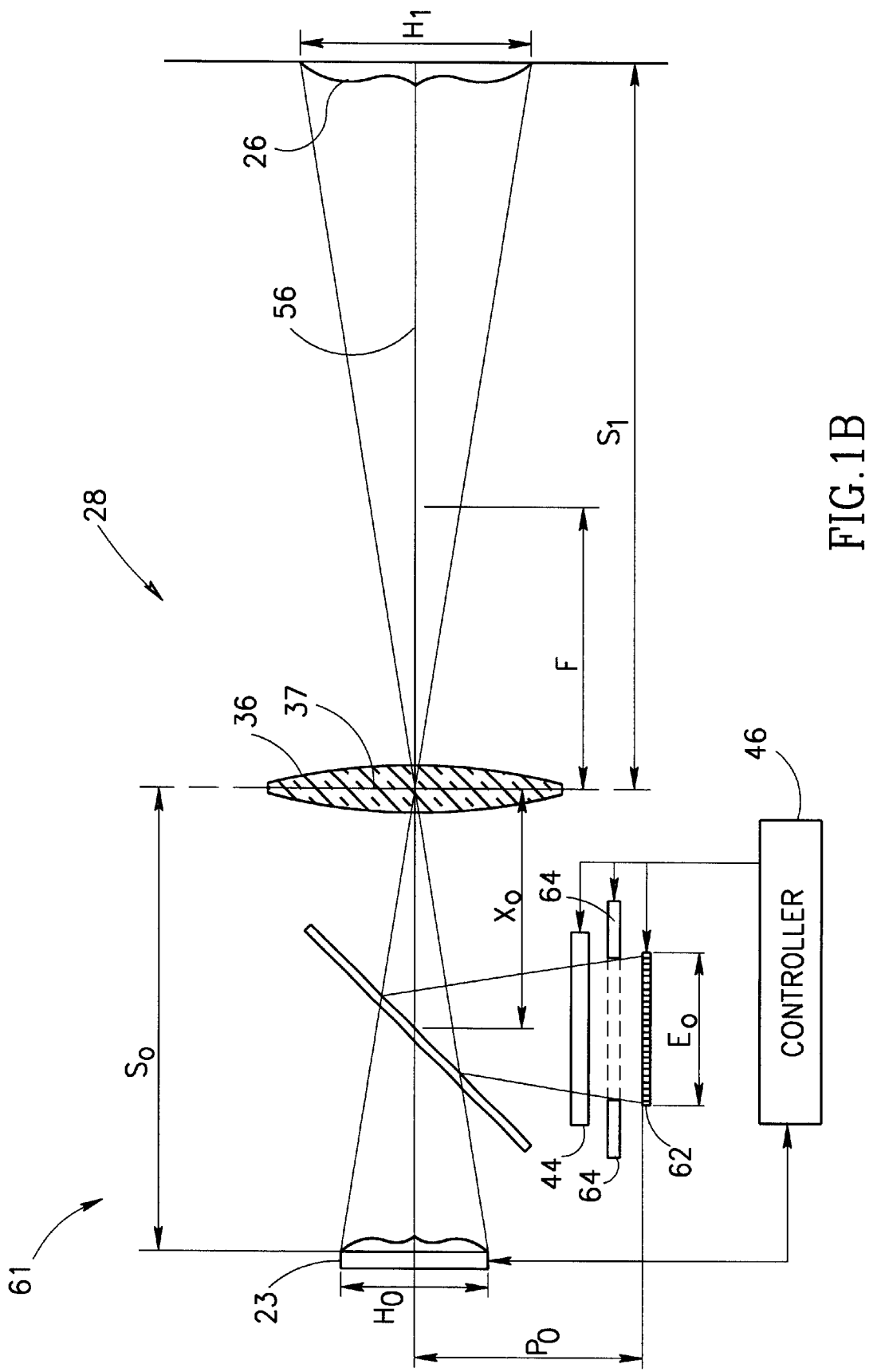
FIG. 1B is a schematic illustration of a camera with "through-the-lens" lighting, constructed in the CMOS technology and a dual modulation program for photosensitive-surface protection from stray light, in accordance with a preferred embodiment of the invention.

Reference is now made to FIG. 1B, which is a schematic illustration of a camera 61 with "through-the-lens" lighting, constructed in the CMOS technology, in accordance with a preferred embodiment of the invention. Camera 61 is similar in design to camera 60. However, fast-light modulator 52 is eliminated. A photosensitive surface 23 comprises solid-state pixels which can be modulated at the level of the pixels. Controller 46 controls the modulation of the light-source and the modulation of the pixels. In a preferred embodiment of the invention, the photosensitive surface is a surface such as those shown in PCT Application PCT/IL98/00476 filed Sep. 28, 1998, the disclosure of which is incorporated by reference. Alternatively or additionally other gateable solid state imaging detectors can be used such as those described in U.S. Pat. No. 5,345,266; in "A new electrooptical mixing and correlating Sensor: Facilities and Applications of the Photonic Mixer device (PMD); in "Large Area Array With Non-Linear Active Current-Mode Pixels, a talk given by Vincent Clark at 1996 SSCTC Workshop on CMOS Imaging Technology; in "Image sensing with programmable offset pixels for increased dynamic range of more than 150 dB" by Oliver Vietze and Peter Seitz, SPIE Vol. 2654, p. 93 ff., the disclosures of which are all incorporated herein by reference or other such devices known in the art. In general, any photosensitive surface whose sensitivity can be modulated (or turned on an off) quickly either on a pixel by pixel basis or as a whole, can be used in various preferred embodiments of the invention.

The dual-modulation program described in FIG. 2 and the conditions that should preferably be met, as discussed above, also apply to cameras 61.

In some preferred embodiments, a method of modulation is carried out as an effective gain control, to equalize to some extent the amount of light reflected from the main object and the amount of light reflected from the background. Since illumination density (erg/cm$^2$) declines with the square of the distance from the light source, the main object, being generally closer to the camera than the background, is generally illuminated with a greater light density than the background. Preferably, the gain-control modulation program blocks light from reaching the photosensitive surface during part of the time during which light reaches it only from the main object, while accepting all of the light reflected from the background. In this manner, reflected radiation from the main object and reflected radiation from the background are recorded for unequal periods. Alternatively or additionally, the number of pulses recorded for the different pixels is varied, to reach the same effect.

In one preferred embodiment of the invention the relative timing of the gating of all of the pulses is adjusted to reduce the range of brightness of the pixels. For example, a number of images at different gatings (utilizing only a few pulses) may be compared to determine a desirable timing. This last method may be used for the embodiment of FIG. 1A as well as for the embodiment of FIG. 1B.

Thus, to some extent, the recorded illumination of the main object and of the background are homogenized.

Since modulation of the photosensitive surface is carried out at the level of the pixels in FIG. 1B, it is possible to control the amount of radiation reflected from the scene that is collected on each pixel. In this manner, effective gain control, homogenizing the amount of light reflected from the main object and the amount of light reflected from the background is better achieved.

In some preferred embodiments, one or more tests utilizing a limited number of pulses are performed for a particular scene and controller 46 determines the period of modulation for each pixel for optimum reduction of bright and dark spots.

Figure 3:
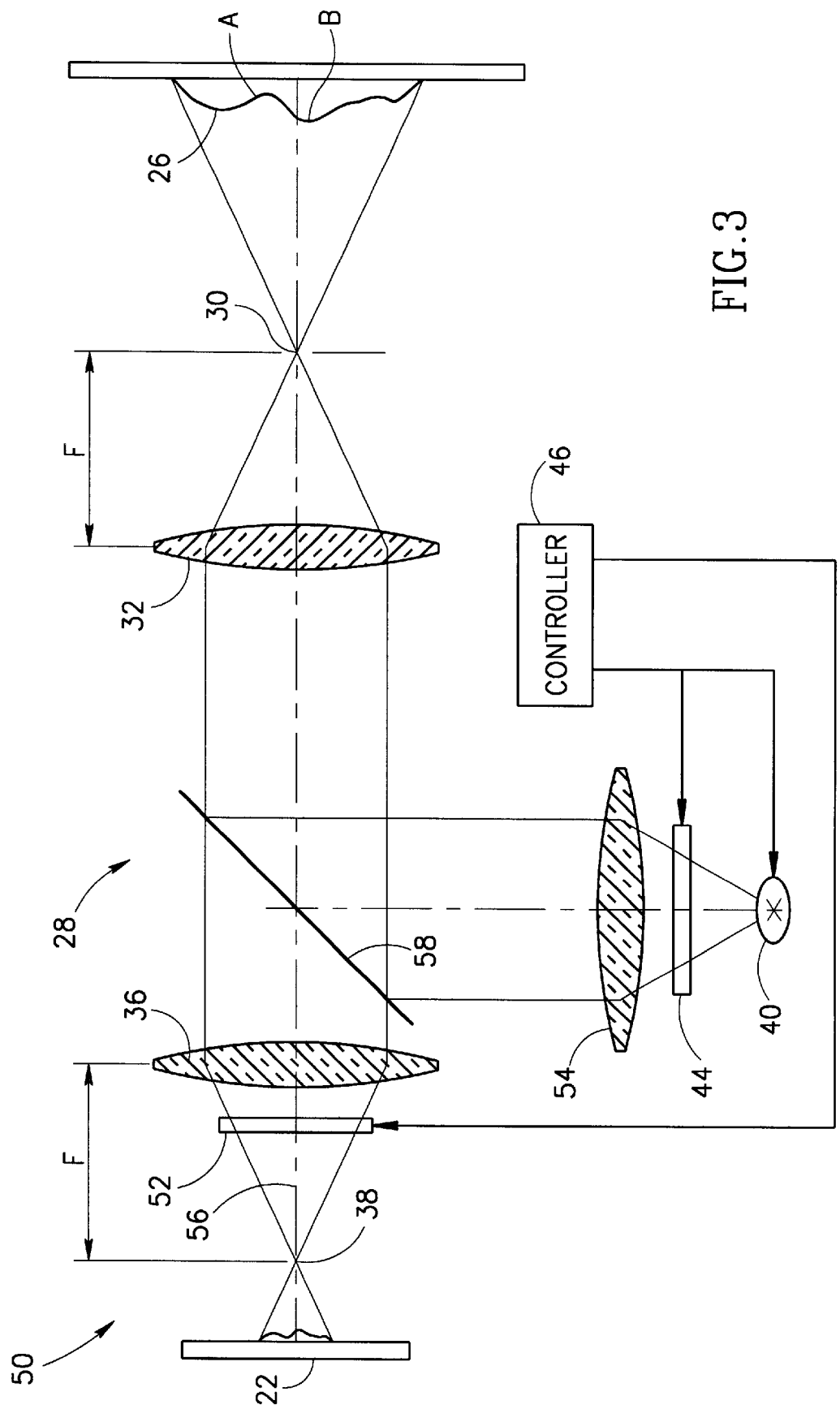
FIG. 3 is a schematic illustration of a telecentric, optical-ranging camera with "throughthe-lens" lighting, utilizing the dual-modulation program for photosensitive-surface protection from stray light, in accordance with a preferred embodiment of the invention.

Reference is now made to FIG. 3, which is a schematic illustration of a telecentric, optical-ranging camera 50 with "through-the-lens" lighting, which likewise uses the dual-modulation program to protect the photosensitive surface from stray light, in accordance with a preferred embodiment of the invention.

In FIG. 3, a light source 40 is collimated by a projection lens 54 and boresighted with optical axis 56 using beam-splitter (or mirror) 58. The reflected radiation from scene 26 is likewise collimated. With the telecentric system and an internally collimated light source, the light emerges through the lens, illuminating substantially only the field of view of the camera Preferably, light-source modulator 44 is positioned between light source 40 and beamsplitter (or mirror) 58. Preferably, modulator 52 is positioned between beamsplitter (or mirror) 58 and photosensitive surface 22.

Figure 4:
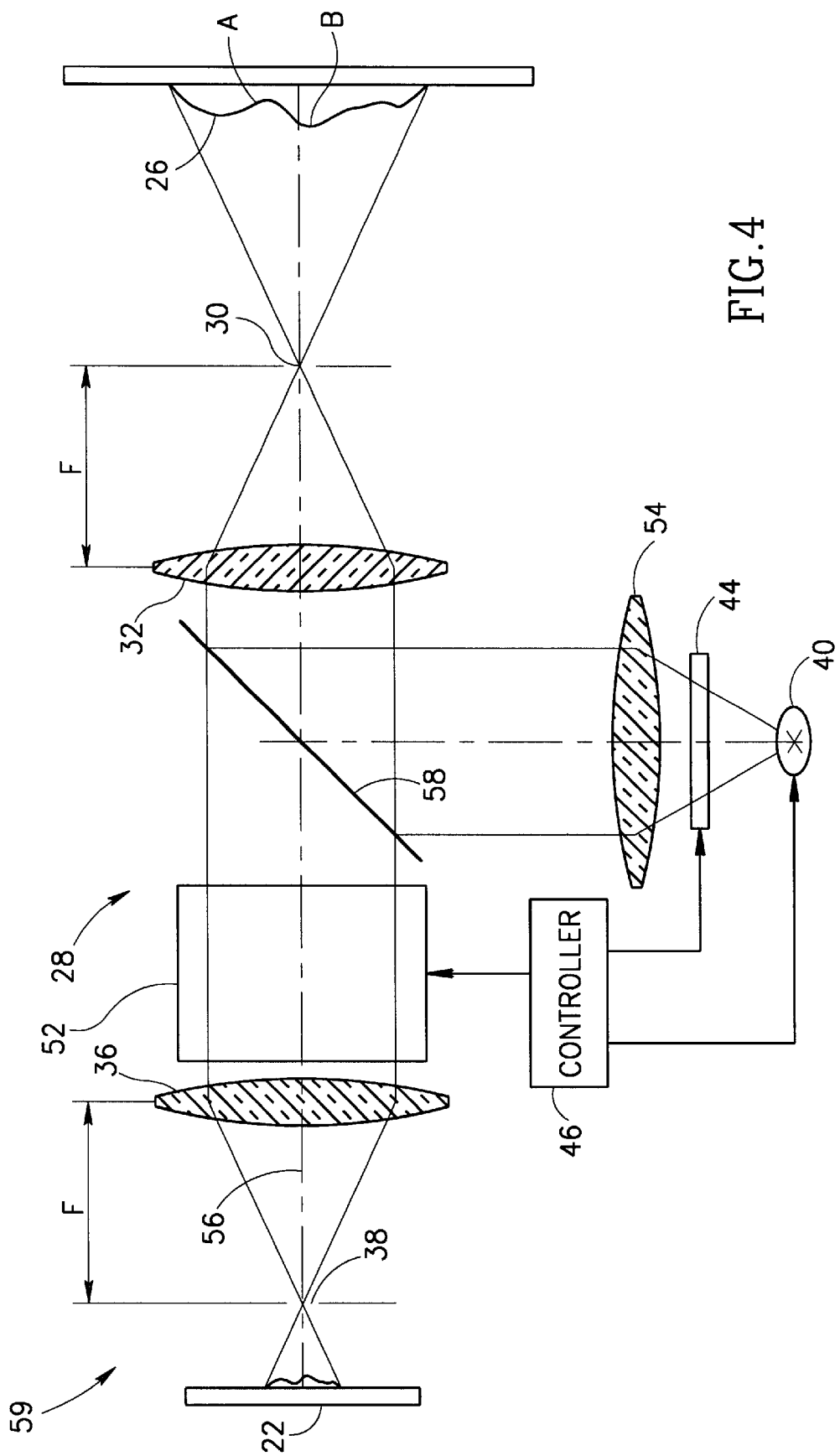
FIG. 4 is a schematic illustration of another telecentric, optical-ranging camera with "through-the-lens" lighting, utilizing the dual-modulation program for photosensitive-surface protection from stray light, in accordance with a preferred embodiment of the invention.

Reference is now made to FIG. 4, which is a schematic illustration of another telecentric, optical-ranging camera 59 with "through-the-lens" lighting, which again uses the dual-modulation program to protect the photosensitive surface from stray light, in accordance with a preferred embodiment of the invention.

In FIG. 4 modulator 52 is positioned between beamsplitter (or mirror) 58 and photosensitive surface 22, behind focusing optics 36.

A telecentric system may also be used with a CMOS device such as device 23 of FIG. 1B.

The dual-modulation program described in FIG. 2 and the conditions that should preferably be met, as discussed above, also apply to telecentric cameras 50 and 59.

The present invention is not limited to the specific dual-modulation program described here. In some preferred embodiments an optimal dual-modulation program may be determined experimentally, preferably, for a specific camera design. Alternatively or additionally, other dual-modulation programs may be devised theoretically.

Preferably, modulators 52 and 44 are large-aperture, fast-rise-time, solid-state shutters described in PCT/IL98/00060, "Large Aperture Optical Image Shutter," the disclosure of which is incorporated herein by reference. However, they may be mechanical or liquid crystal shutters or some other type of radiation modulator, as known in the art, provided they have the required speed.

In a preferred embodiment of the present invention, photosensitive surface 22 comprises a photographic film. Alternatively, photosensitive surface 22 comprises a CCD array. Alternatively, photosensitive surface 22 comprises some other photosensitive surface, as known in the art.

Preferably, extended light source 62 comprises a flash or a discharge lamp. Alternatively extended light source 62 comprises some other suitable light source, as known in the art, which may be extended light sources.

Preferably, light source 40 is a laser light source. Alternatively, light source 40 comprises an other suitable light source, as known in the art.

The present invention has been described using non-limiting detailed descriptions of preferred embodiments thereof that are provided by way of example and are not intended to limit the scope of the invention. Variations of embodiments described will occur to persons of the art. Furthermore, the terms "comprising," "comprise," "include," and "including" or the like, shall mean, when used in the claims, "including but not necessarily limited to." The scope of the invention is limited only by the following claims.

What is claimed is:

1. A camera with through-the-lens lighting, comprising:

a modulated light source;

a photosensitive surface;

focusing optics, having an optical axis, that forms an image of a scene, within a field of view, on the photosensitive surface, wherein light from the light source is boresighted with the optical axis and directed toward the scene, illuminating substantially only the field of view of the camera;

a modulator which modulates radiation striking the photosensitive surface or the sensitivity of the photosensitive surface, wherein the modulator does not modulate the light source; and a controller, controlling the modulator and the modulation of the light-source, to block a reaction of the photosensitive surface whenever the modulated source of light is on, while insuring that all the desired radiation reflected from the scene is collected.

2. A camera according to claim 1 and including a collimating lens which collimates the light.

3. A camera according to claim 1 wherein the light is coherent.

4. A camera according to claim 2 wherein the light is coherent.

5. A camera according to claim 1 wherein the light is incoherent.

6. A camera according to claim 2 wherein the light source is incoherent.

7. A camera according to any of claims 1–6, wherein the camera is an optical ranging camera, wherein only a desired, gated portion of the reflected radiation from the scene is collected and wherein intensity values of the image are indicative of distances of objects from the camera.

8. A camera according to any of claims 1–6, wherein the focusing optics comprises telecentric optics which collimates also reflected radiation from the scene.

9. A camera according to claim 7, wherein the focusing optics comprises telecentric optics which collimates also reflected radiation from the scene.

10. A camera according to any of claims 1–6 wherein the modulator is operative to vary the sensitivity of the photosensitive surface.

11. A camera according to any of claims 1–6, wherein the modulator modulates radiation striking the photosensitive surface and transmits substantially all the reflected radiation from the scene that reaches the camera.

12. A camera according to any of claims 1–6 wherein the source and photosensitive surface have substantially equivalent optical extents, so that light emerges through the lens, illuminating substantially only the field of view of the camera.

13. A camera according to any of claims 1–6 wherein the light source has an extended area from which light is radiated and comprising a variable-aperture iris adjacent to the extended area and wherein the aperture size controls the extent of the illuminated field of view.

14. A method of creating an image with through-the-lens lighting comprising:

boresighting a beam of incoherent light with the optical axis of a camera, having a field of view;

illuminating a scene with the beam of incoherent light, emerging from the camera along the optical axis, such that a region illuminated by the beam is substantially congruent with the field of view of the camera; and creating an image on a photosensitive surface of the camera using light from the boresighted light that is reflected from the scene that is collected by the camera.

15. A method of creating an image with through-the-lens lighting comprising:

providing a modulated beam of light;

boresighting the beam with an optical axis of a camera having a field of view;

illuminating a scene with the beam, emerging from the camera, such that substantially only the field of view of the camera is illuminated;

modulating the activation of a photosensitive surface of the camera in synchrony with the beam modulation, such that light is blocked from activating the photosensitive surface whenever the beam is on, while insuring that all the desired reflected radiation from the scene is collected on the photosensitive surface; and creating an image on the photosensitive surface using the collected light.

16. A method according to claim 15 wherein modulating the activation comprises blocking light from incidence on the photosensitive surface.

17. A method according to claim 15 wherein modulating the activation comprises modulating the sensitivity of the photosensitive surface.

18. A method according to any of claim 14–17 and including collimating the beam.

19. A method of creating an image with through-the-lens lighting comprising:

providing a beam of light, emanating from an extended source, internal to a camera;

boresighting the beam with an optical axis of the camera; and illuminating a scene with the beam, emerging from the camera, such that the beam illuminates a region substantially congrugent with the field of view of the camera;

modulating the beam;

modulating activation of a photosensitive surface of the camera in synchrony with the beam modulation, blocking light from activating the photosensitive surface whenever the beam is on, while insuring that all the desired reflected radiation from the scene is collected and;

creating an image on the photosensitive surface of the camera using boresighted light that is reflected from the scene that is collected by the camera.

20. A method according to claim 19 wherein modulating the activation comprises blocking light from reaching the photosensitive surface.

21. A method according to claim 19 wherein modulating the activation comprises modulating the sensitivity of the photosensitive surface.

22. A method according to any of claims 15–17 or 21, wherein modulating activation of the photosensitive surface in synchrony with the beam comprises:

estimating the average distance to the scene and the depth of scene;

modulating the light source with a multiple-pulse function of square pulses having a duration of $\delta_1$ seconds each, $\delta_2$ seconds apart, wherein during $\delta_1$, light is transmitted and during $\delta_2$, light is blocked;

modulating activation of the photosensitive surface with a multiple-pulse function of square pulses so that during $\delta_1$, the surface is not sensitive to light and during at least part of $\delta_2$, the surface is sensitive to light; and determining $\delta_1$ and $\delta_2$ responsive the average distance and depth of scene.

23. A method according to claim 22 wherein the duration of the light pulse, is shorter than twice the time taken for light to propagate to the scene and wherein $\delta_1+\delta_2$, the time for a complete modulation cycle, is greater than the total time for light to propagate to the scene and for reflected radiation from all points on the scene to be recovered.

24. A method according to claim 22 wherein estimating comprises:

focusing the camera on the scene using the camera's focusing optics;

determining the distance to a point of optimum focus based on the setting of the focusing optics;

determining the depth of field of the focusing optics for that setting;

estimating the distance to scene based on the distance to a point of optimum focus; and estimating the depth of the scene based on the depth of field of the focusing optics for that setting.

25. A method according to claim 22 wherein estimating comprises:

setting the camera to a range-determining mode;

varying the modulation function; and using the first few images to estimate the distance to the scene and the depth of the scene.

26. A method according to claim 22 wherein a number of pulses of light illuminates the scene to provide a desired illumination thereof, said desired illumination being based at least in part on the determined distance.

27. A method according to claim 22 wherein estimating comprises setting the value of distance to the scene plus the depth of the scene to be equal to the range of the light source.

28. A method according to any of claims 28–30 or 35, wherein modulating activation of the photosensitive surface in synchrony with the beam comprises:

estimating the amount of light reflected from different portions of the scene which reaches the camera from various parts of the scene;

modulating the light source with a multiple-pulse function of square pulses having a duration of $\delta_1$ seconds each, $\delta_2$ seconds apart, wherein $\delta_1$ and $\delta_2$ are determined responsive to said estimate and during $\delta_1$, light is transmitted and during $\delta_2$, light is blocked; and modulating activation of the photosensitive surface with a multiple-pulse function of square pulses so that during $\delta_1$, the surface is not sensitive to light and during at least part of $\delta_2$, the surface is sensitive to light, so as to adjust the range of light reaching various portions of the photosensitive surface.

29. A camera according to any of claims 1–6 wherein the controller controls the modulation of the light source so that the light source provides a plurality of light pulses such that a total desired amount of light reaches the photosensitive surface from the scene.

* * * * *

UNITED STATES PATENT AND TRADEMARK OFFICE
CERTIFICATE OF CORRECTION

PATENT NO. : 6,445,884 B1  Page 1 of 1
DATED : September 3, 2002
INVENTOR(S) : Ori J. Braun et al.

It is certified that error appears in the above-identified patent and that said Letters Patent is hereby corrected as shown below:

<u>Title page,</u>
Item [75], Inventors, add -- Ori J. Braun, Tel-Aviv (IL) -- preceding "Giora Yahav"
Item [63], Related U.S. Application Data, change "08/918,357" to -- 08/981,357 --
Item [56], References Cited, OTHER PUBLICATIONS, change "Densing" to
-- Sensing --; and change "Synamic" to -- Dynamic --

Signed and Sealed this

Eleventh Day of February, 2003

JAMES E. ROGAN
*Director of the United States Patent and Trademark Office*